United States Patent [19]
Rankin

[11] Patent Number: 5,178,583
[45] Date of Patent: Jan. 12, 1993

[54] RELEASABLE FOLDING LINK MEMBER FOR PROVIDING OPENING TORQUE

[75] Inventor: Ian M. Rankin, Dorking, England

[73] Assignee: The Secretary of State for Defence in Her Britannic Majesty's Government of the United Kingdom of Great Britain and Northern Ireland, London, United Kingdom

[21] Appl. No.: 536,574
[22] PCT Filed: Dec. 9, 1988
[86] PCT No.: PCT/GB88/01088
   § 371 Date: Jun. 29, 1990
   § 102(e) Date: Jun. 29, 1990
[87] PCT Pub. No.: WO89/05265
   PCT Pub. Date: Jun. 15, 1989

[30] Foreign Application Priority Data
Dec. 10, 1987 [GB] United Kingdom ............ 8728903

[51] Int. Cl.⁵ ............ F16D 3/60; B64G 9/00; E04H 15/60
[52] U.S. Cl. .................. 464/114; 403/100; 464/901
[58] Field of Search ............ 464/114, 183, 120, 162, 464/169, 50, 901; 403/100, 102, 101

[56] References Cited

U.S. PATENT DOCUMENTS

| | | | |
|---|---|---|---|
| 738,554 | 9/1903 | Lingel | 403/100 |
| 895,372 | 8/1908 | Hostetter et al. | 403/100 X |
| 1,504,889 | 8/1924 | Hansen | 135/109 |
| 1,906,218 | 4/1933 | Patchell | 403/100 |
| 2,066,182 | 12/1936 | Lenz | 403/100 |
| 2,762,210 | 9/1956 | Redard | 464/50 |
| 4,437,480 | 3/1984 | Husa | 403/100 X |
| 4,527,579 | 7/1985 | Knotter et al. | 403/100 X |
| 4,753,259 | 6/1988 | Hansen et al. | 403/100 X |

FOREIGN PATENT DOCUMENTS

| | | |
|---|---|---|
| 1062582 | 9/1979 | Canada . |
| 1128243 | 1/1957 | France . |
| 1301414 | 7/1962 | France . |

Primary Examiner—Daniel P. Stodola
Assistant Examiner—Tony A. Gayoso
Attorney, Agent, or Firm—Nixon & Vanderhye

[57] ABSTRACT

A linkage for rotatably joining two members of a structure together including a rod member (1); a sleeve (8) slideable over a bifurcated, cylindrical end portion of the rod member; a link member (3) pivoted within the ends of the said end portion and having two parallel sides profiled to provide a sliding fit within the sleeve, an angled side portion (16) against which the end of the sleeve is urged when the linkage is in a partly open position and a rounded, profiled end portion to provide clearance of the sleeve when the linkage is opening; pin and guide elements (12,14) for limiting the sliding movement of the sleeve on the end portion; and a coil spring (10) located around the end portion and between one end of the sleeve and a step on the rod member to provide a torque for opening the linkage when released from the closed position. A common base may carry a plurality of link members on each of which a rod member may be pivotally mounted, or alternatively a link member may be symmetrical in form and have a rod member pivotally mounted in similar fashion at each end.

6 Claims, 2 Drawing Sheets

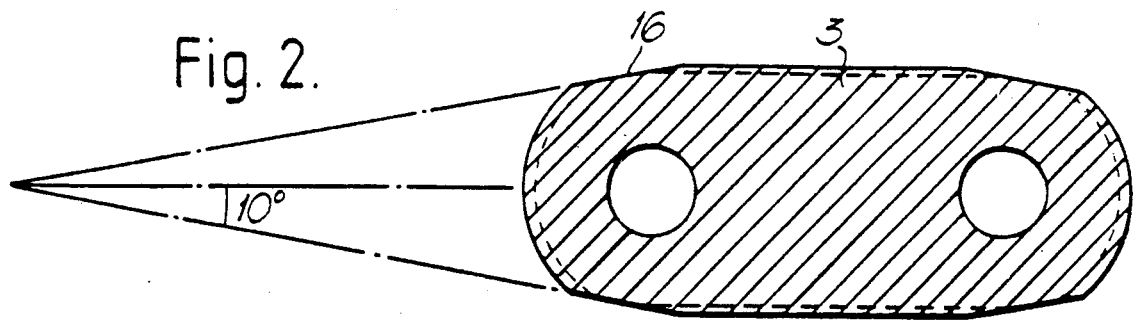
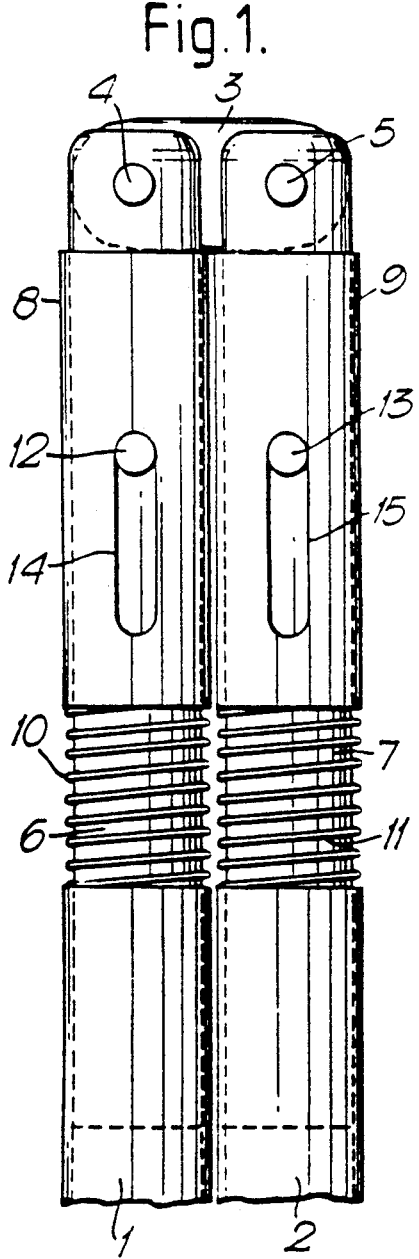
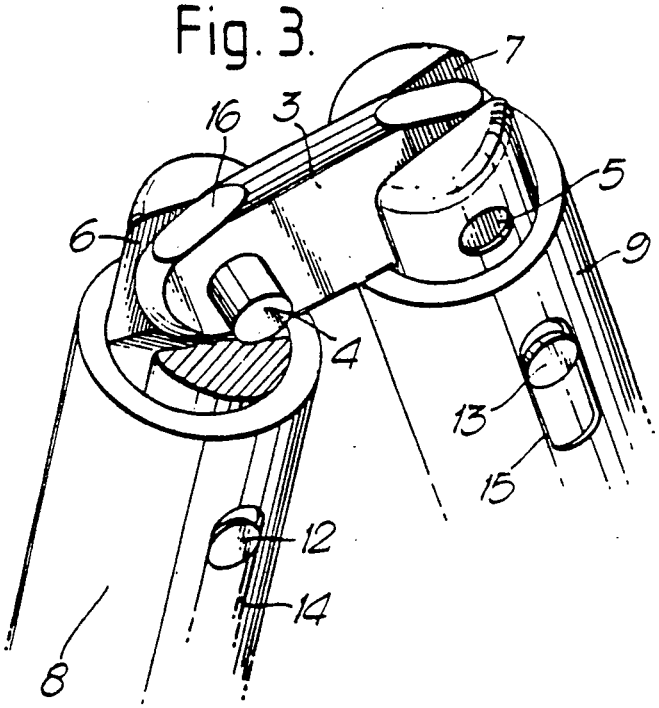
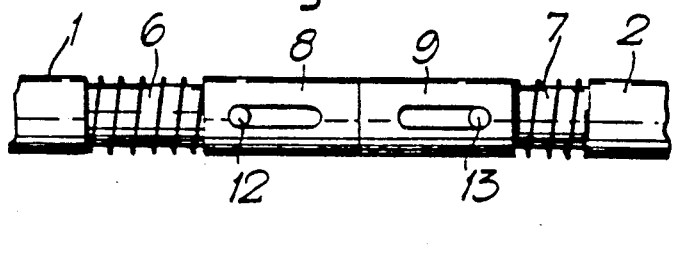

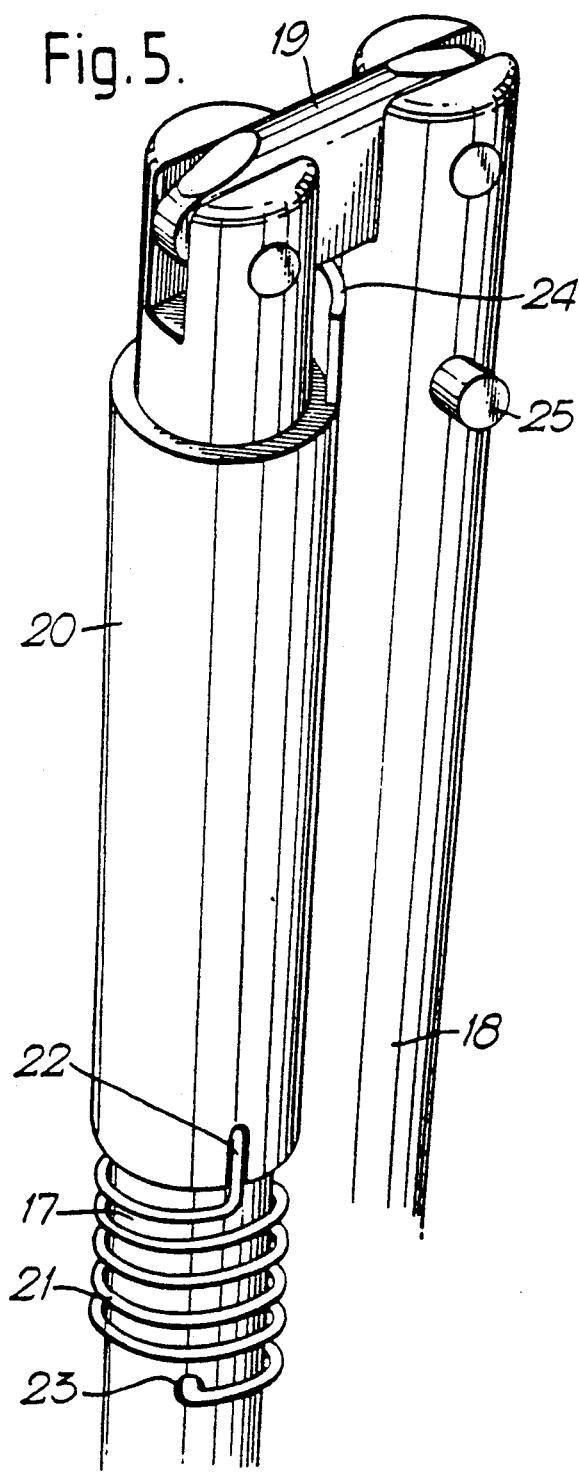
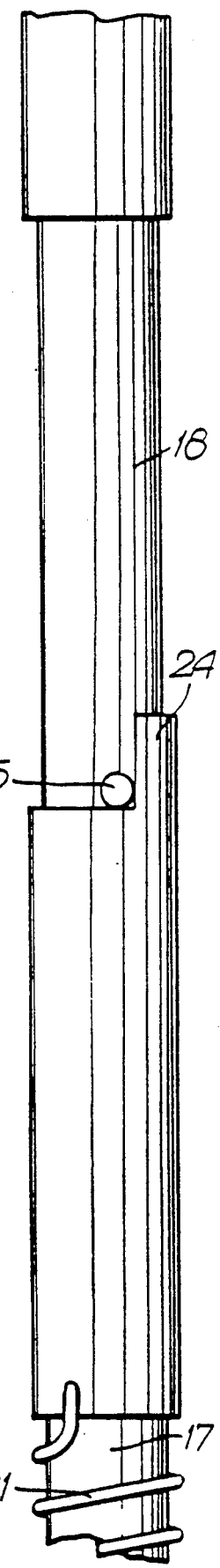

5,178,583

RELEASABLE FOLDING LINK MEMBER FOR PROVIDING OPENING TORQUE

BACKGROUND OF THE INVENTION

1. Field of the Invention

This invention relates to linkages for rotatably joining two parts of a structure together, and specifically provides for two members to be joined together in a first attitude until, on deployment for example, they are released and automatically take up a second, rigid attitude.

2. Discussion of Prior Art

Such linkages are known and used, for example, for folding rod or tubular members of a structure intersected by nodes. The object in this arrangement is for the structure to be folded into a minimum volume for transportation, and for it to open automatically into a specific, fixed relationship when required. A particular requirement for this is the deployment of skeletal structures used as space platforms: these have to be stowed as compactly as possible in the launch vehicle and need to be erected reliably and as automatically as possible. The types of joint used hitherto for such purposes have usually been bulky, have required additional components to restrain the initial impulsion rate, and have contained separate locking elements.

SUMMARY OF THE INVENTION

According to this invention, a linkage comprises a rod member; a sleeve slidable over a bifurcated, cylindrical end portion of the rod member; a link member pivoted within the ends of the said end portion and having two parallel sides profiled to provide a sliding fit within the sleeve, an angled side portion against which the end of the sleeve is urged when the linkage is in a partly open position and a rounded, profiled end portion to provide clearance for the sleeve when the linkage is opening; means for limiting the sliding movement of the sleeve on the end portion; and a coil spring located around the end portion and between one end of the sleeve and a step on the rod member to provide a torque for opening the linkage when released from the closed position.

The rod member may comprise a rod or tube into which a shaft having a bifurcated end is rigidly secured, the shaft constituting the end portion of the rod member and providing a seat along which the sleeve is slideable and for the coil spring which extends from the end of the tube to the sleeve.

The link member may be an appendage to a base unit, for example, or a multiple joint may include a plurality of similar link members, but in an alternative and preferred form the link member may be symmetrical in form and be pivotally attached in similar fashion to two similar rod members and the invention may provide a linkage for interconnecting two rod members by the said link member.

Whilst the link member as described need have an angled side portion at one or both ends of only one of its two parallel sides, a more adaptable linkage may result if a similar angled side portion is provided at one or both ends of the other parallel side. The linkage may readily be released from the locked, open position by withdrawing the sleeve from the link member against the action of the spring, and if the link member is in the latter form then the rod member may be rotated in either direction into the closed position.

The angled side portions are preferably formed at an angle in the range 5° to 15° to the parallel sides of the link member, an angle of 10° being found particularly suitable in one form of construction, but the extent of the angled side portion must not be too great to cause the length of the parallel sides to be insufficient to provide rigidity when engaged in the open position inside the sleeve.

BRIEF DESCRIPTION OF THE DRAWINGS

By way of example, embodiments of the invention will now be described with reference to the drawings, of which FIG. 1 is a side elevation of a linkage in the closed position, FIG. 2 is an enlarged section on the mid-plane of the link member of the linkage illustrated in FIG. 1, FIG. 3 is a partly cut-away perspective view of the linkage in a partly open position, FIG. 4 is a side elevation of the linkage in the locked, open position, FIG. 5 is a perspective view of an alternative arrangement, in the open position, to that shown in FIGS. 1 to 4, and FIG. 6 is a side elevation of the alternative arrangement in the closed position.

DETAILED DISCUSSION OF PREFERRED EMBODIMENTS

With reference to FIG. 1, two hollow rods 1 and 2 are inter-connected by a link member, the link member being rotatably mounted on pivots formed by two axles 4 and 5 passing through the bifurcated ends of shafts 6 and 7 secured within the ends of the rods 1 and 2 respectively. Sleeves 8 and 9 are slideably retained on the shafts 6 and 7 respectively, and are urged against the link member 3 by coil springs 10 and 11 mounted around the shafts 6 and 7 and bearing against the ends of the rods 1 and 2 which function as a step on the shafts. The extent of sliding movement of the sleeves is limited by the provision of spigots 12 and 13 on the shafts which extend into respective slots 14 and 15 in the sleeves.

The axles 4 and 5 may be secured either to the link member 3 or to one or both of the bifurcated ends of each shaft; care has to be taken that the axles do not protrude from the shaft and hence foul the end of the respective sleeve when the linkage is opened.

The link member 3 is in the form of a flat plate whose thickness enables it to rotate within the bifurcated ends of the shafts 6 and 7 (see FIG. 3). As shown in FIG. 2, the link member has two parallel long sides which are profiled to enable it to slide with a close fit within the inside walls of the sleeves, and rounded ends which are likewise shaped and profiled to slide into and within the sleeves.

At each end of both of the long sides of the link member there is provided a flat portion 16 inclined at an angle of 10° to the long sides. The inclined portions are not profiled and provide a bearing surface against which the ends of the sleeves 8 and 9 are urged when the linkage is in a partly open position, as shown in FIG. 3.

In use, an assembly of members interconnected by one or more of such linkages may be stored within a larger tube or other container; in this position the springs 10 and 11 are in a compressed state urging the sleeves 8 and 9 against the link member 3. When the linkage is released, for example by removal from its container, the torque created by the force of the sleeves against the link member causes the rods 1 and 2 to separate, an intermediate position being shown in FIG. 3. As the rods continue to separate, the reaction between the sleeves and the inclined portions 16 tends to keep the torque at a constant value, and the sleeves continue to move along the shafts under the force of the springs so that the link member commences to enter the sleeves.

Finally, the fully open (straight) position is reached, illustrated in FIG. 4, in which the link member 3 is fully within the sleeves which are themselves in contact with one another.

By correct profiling of the periphery of the link member a rigid, substantially play-free fit of the link member within the sleeves can be obtained and by the limitation of the sleeve movement imposed by the spigot and slot arrangement correct positioning of the sleeve ends over the mid-line of the link member can be achieved. The maximum packing density of rods in a storage container is made possible by providing for the separation of the pivots to be substantially equal to the diameter of the hollow rods 1 and 2, for the sleeves to have the same diameter as the rods and for the springs to be contained within said diameter.

In the embodiment described, a linkage between two similar members has been provided by an essentially symmetrical arrangement. The invention may however take the form of an arrangement in which a single rod carrying a spring-loaded sleeve is rotatable on release of the link member just described. Such an arrangement may provide, for example, a pivotal connection between more than two rods, each rod being separately pivotable on a common platform, or one rod to a fixed member such as a base unit.

In these cases, the sliding movement of each sleeve on its shaft may be limited either by the spigot and slot arrangement just described, or by a physical step on the common or fixed member. Alternatively, just one of the shafts carries a sleeve, as in the embodiment illustrated in FIGS. 5 and 6.

In this embodiment two shafts 17 and 18 both having bifurcated ends are as before connected by a link member 19. One of the shafts 17 carries a sleeve 20 which is urged towards the link member by a coil spring 21 which in order to prevent rotation of the sleeve on the shaft is positively located in a slot 22 in the sleeve and a recess 23 in the shaft.

The sleeve 20 is provided with an axially extending nib portion 24 which in the open position bears against the link member but which when the joint closes after release engages against a spigot 25 provided on the other shaft 18, as illustrated in FIG. 6. In this embodiment, the sleeve 20 is sufficiently long to cover, in the closed position, the entire hinged portion of the joint including the link member.

This arrangement, particularly when coupled with a spigot/slot guide means in the sleeve, provides an additional torsional rigidity to the joint and hence to any structure of which the joint forms an integral part.

By combining different linkage arrangements, quite complex structures may be assembled in a form which can be stored compactly prior to erection at a remote location, for example, honeycomb or other skeletal support structures intended for deployment in space.

In all cases, the linkage can be made quite rigid against bending stresses and yet may be closed very readily simply by manually sliding the sleeve or sleeves away from the link member against the action of the spring.

Those skilled in the art will appreciate that there are many variations in design, other than the embodiments just described, within the scope of the invention. The materials used for the linkage may be metallic, but particularly where weight considerations are important carbon fibre resin composites may be used.

I claim:

1. A releasable linkage including:
   a first rod member having a bifurcated end portion and a remainder portion;
   an elongate link member having ends and means for pivotally mounting said link member about one of said ends within said bifurcated end portion, the relative rotational positions of said rod member and link member defining closed, intermediate and open positions of the linkage;
   a sleeve slidable on said rod member over said end portion;
   means for limiting the sliding movement of said sleeve over said end portion; and
   a coil spring means, located around said rod member, for urging said sleeve against the link member, said coil spring means, said sleeve and said link member comprising a means for providing a torque and for rotating said link member relative to said rod member from said closed position to said open position of the linkage, wherein a second rod member having a bifurcated end portion is provided, said elongate link member is generally symmetrical in form and includes means for pivotally mounting one end within said bifurcated end portion of said second rod member, in which one of said first and second rod members includes a lateral stud and the other of said first and second rod members includes a sleeve of sufficient length to cover said elongate link member and having an axially-extended nib portion for engaging said elongate link member when the linkage is in the closed position and for engaging with said stud to provide the linkage with rotational stability when the linkage is in the open position.

2. A releasable linkage including:
   a first rod member having a bifurcated end portion and a remainder portion;
   an elongate link member having ends and means for pivotally mounting said link member about one of said ends within said bifurcated end portion, the relative rotational positions of said rod member and link member defining closed, intermediate and open positions of the linkage;
   a sleeve slidable on said rod member over said end portion;
   means for limiting the sliding movement of said sleeve over said end portion; and
   a coil spring means, located around said rod member, for urging said sleeve against the link member, said coil spring means, said sleeve and said link member comprising a means for providing a torque and for rotating said link member relative to said rod member from said closed position to said open position of the linkage, wherein said link member comprises:

two parallel sides profiled to provide a sliding fit within said sleeve;

an inclined portion adjacent the parallel sides of the link member against which the end of the sleeve is urged when said linkage is in said intermediate position; and a rounded, profiled end portion to provide clearance for the sleeve, wherein said inclined portion of said link member forms an angle with said parallel side in the range of 5° to 15°.

3. A releasable linkage according to claim 2 in which said end portion of the first rod member has a smaller diameter than said remainder of the first rod member and provides a seat along which said sleeve is slidably mounted and a step against which said coil spring bears.

4. A releasable linkage according to claim 3 in which said end portion of the first rod member includes a spigot and said sleeve is provided with a longitudinal slot, said spigot and slot comprising a means for limiting axial movement and rotation of said sleeve on said end portion.

5. A releasable linkage according to claim 2 wherein a second rod member having a bifurcated end portion is provided and in which said elongate link member is generally symmetrical in form and includes means for pivotally mounting one end within said bifurcated end portion of said second rod member.

6. A releasable linkage according to claim 5 in which one of said first and second rod members includes a lateral stud and the other of said first and second rod members includes a sleeve of sufficient length to cover said elongate link member and having an axially-extended nib portion for engaging said elongate link member when the linkage is in the closed position and for engaging with said stud to provide the linkage with rotational stability when the linkage is in the open position.

* * * * *